March 14, 1961
H. BERG
2,974,357
FISH HOLDING CLAMP
Filed Sept. 14, 1959
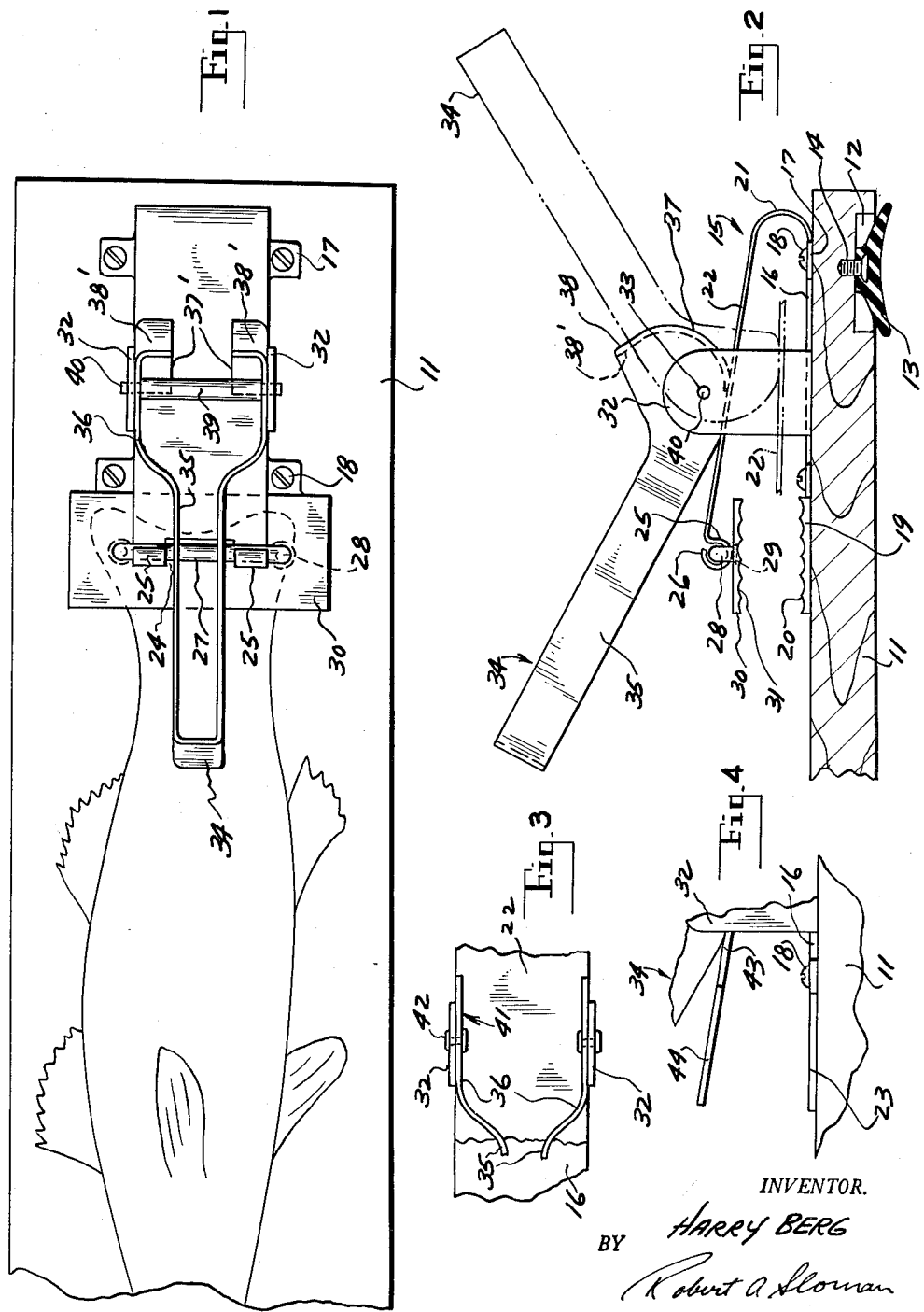
INVENTOR.
BY HARRY BERG
Robert A. Sloman
ATTORNEY United States Patent Office 2,974,357
Patented Mar. 14, 1961

2,974,357
FISH HOLDING CLAMP
Harry Berg, 16156 Santa Rosa, Detroit 21, Mich.
Filed Sept. 14, 1959, Ser. No. 839,842
4 Claims. (Cl. 17—8)

This invention relates to a fish holding clamp and more particularly to a clamp and associated support for a fish.

Heretofore various mechanisms have been devised for fixedly anchoring a fish upon a support to facilitate scaling, cleaning and filleting.

It is the object of the present invention to provide a novel fish holding clamp and associated support upon which the fish is horizontally disposed with a portion of the tail gripped by the clamp.

It is another object to provide an efficient and easily releasable clamping mechanism.

These and other objects will be seen from the following specification and claims in conjunction with the appended drawing in which:

Fig. 1 is a fragmentary plan view of the present holding clamp in release position upon a support with a portion of the fish positioned for retaining therein.

Fig. 2 is a side elevational view of the present clamp with a portion of the support shown in section.

Fig. 3 is a fragmentary plan view of a slightly different form of cam arm mounting and cam construction.

Fig. 4 is a fragmentary side elevational view similar to Fig. 2 illustrating a slightly different form of top grip.

It will be understood that the above drawing illustrates merely a preferred embodiment of the invention and that other embodiments are contemplated within the scope of the claims hereafter set forth.

Referring to Figs. 1 and 2, an elongated rectangular support 11 is provided, preferably of wood, whose undersurface is recessed adjacent its corners at 12 to receive the respective mounting and securing flexible suction cups 13 anchored to the support by fasteners 14. This provides a convenient means of mounting support 11 upon a table top or other horizontally disposed surface.

The present clamp generally indicated at 15, includes an elongated base strip 16 of a suitable spring steel, including on opposite sides the laterally extending longitudinally spaced mounting bosses 17. Screws 18 project through said bosses and into support 11 fixedly mounting said clamp adjacent one end thereof.

A transverse laterally enlarged fixed gripping plate 19 forms a part of base strip 16 and snugly bears against support 11. Plate 19 in the preferred embodiment has a series of transverse serrations 20 formed in its top surface to increase frictional contact with the fishtail illustrated in Fig. 1.

The opposite end of base strip 16 is reversed curved at 21 treminating in the upwardly inclined flattened arm 22. The free end of said arm is cutaway at 24 defining bifurcated end portions which are downturned and curved around substantially in the form of a circle defining hinge elements 25 whose free edges 26 are spaced from the end portions of said arm.

Transverse pivot pin 27 is loosely retained and rotatively positioned within hinge elements 25. The free ends of pin 27 are downturned at 28, and project through corresponding apertures in movable gripping plate 30. Said plate is normally spaced upwardly from gripping plate 19 and adapted to compressive justaposition therewith.

The free ends of pin 27—28 are peened or otherwise expanded at 29, Fig. 2, to operatively and retainingly secure upper gripping plate 30. At the same time said plate is swivelly mounted for rotative self locating movement about the horizontal axis defined by pin 27. The undersurface of gripping plate 30 is similarly serrated at 31 for increased frictional engagement with the fishtail.

Forming a part of base strip 16 and extending upwardly therefrom are a pair of parallel spaced upright supports 32 transversely apertured at 33 adjacent their upper ends to provide a pivotal mounting for the cam arm 34, by which gripping plate 30 is movably projected downwardly into cooperative registry with gripping plate 19 with the fishtail interposed.

Cam arm 34, in the preferred embodiment, is of U-shape including parallel spaced elongated flat sides 35 which lie in planes extending at right angles to the plane of the base strip 16. Side members 35 towards their lower ends are laterally displaced outwardly defining end portions 36 in opposed spaced relation which include the outer arcuate cam surfaces 37 terminating in the flats 38. The cam ends 36—37 are biased laterally outward against supports 32.

In the solid line release position shown in Fig. 2, cam surfaces 37 loosely bear against the top surface of the flexible and resilient grip supporting arm 22. The free upright ends 36 forming a part of arm 34 include the inwardly disposed oppositely arranged flanges 37'—38'. Flanges 37' are arcuate corresponding to arcuate cam surfaces 37, whereas the flat portions 38' correspond to the flats 38 of Fig. 2.

The advantage of flanges 37'—38' is that increased bearing surfaces are established between the cam end of handle 34 and flexible arm 22. This is the preferred construction, though flanges 37'—38' may be omitted, as shown in Fig. 3.

Pivot pin 39 is interposed in compression between the resilient free ends 36 of handle 34. As shown in Fig. 1, pin 39 terminates in the end portions 40 of reduced diameter defining retaining shoulders in said pin which engage the arm ends 36 to maintain the spaced relationship shown. The reduced ends 40 of said pin extend outwardly through end members 36 and through apertures 33 in upright supports 32, being self-retaining as shown.

To lock the clamp, handle 34 is rotated to the dotted line position shown in Fig. 2, with cams 37—37' bringing movable gripping plate 30 into close juxtaposition with gripping plate 19. Flats 38—38' retain arm 22 in substantially the dotted line position of Fig. 2. The clamp is easily releasable with a small amount of upward pressure applied adjacent the free end of the handle shown in dotted lines.

A slight variation of the cam handle is shown in Fig. 3 wherein the end portions 35 are the same as above described in connection with Fig. 1, including cam surfaces 37 and the flats 38. The main difference is that the adjacent flanges 37'—38' shown in Fig. 1, are omitted.

An additional difference is that instead of the single pivot pin 39, individual rivets 42 are employed for pivotally mounting and retaining the free ends of the handle upon and between upright supports 32 forming a part of base strip 16.

Another variation is shown in Fig. 4 wherein the flexible flat arm 43 corresponding to arm 22 of Fig. 2, terminates in the transverse upper gripping plate 44 as an integral part thereof, omitting the swivel mounting shown in Fig. 2. While the preferred embodiment shows such swivel mounting, it is contemplated that movable gripping plate 44 may function as an integral part of flexible arm 43.

Fig. 4 also illustrates another variation in that the opposed surfaces of gripping plates 23—44 are flat, omitting the serrations of Fig. 2. Under some conditions, the serrations may be omitted, reducing the cost of manufacture, but nevertheless producing an efficient clamp for the tail end of the fish.

Having described by invention, reference should now be had to the following claims.

I claim:

1. A fish holding clamp comprising, a horizontally disposed support adapted to receive a fish, an elongated flexible base strip centrally positioned adjacent one end of said support and fixedly secured thereto, a fixed gripping plate on the support upon one end of said strip extending transversely thereof, an intermediate portion of said strip being reverse curved and inclined upwardly in opposition to said base strip defining a yieldable arm having a free end, a transverse movable gripping plate upon the free end of said arm, juxtaposed over and normally spaced from said fixed gripping plate, a pair of upright supports joined to intermediate side portions of said base strip and arranged on opposite sides of said arm and projecting thereabove, an elongated upwardly inclined handle overlying said arm, and cam means upon one end of said handle adjacent said supports, pivotally mounted thereon retainingly engaging said arm intermediate its ends and adapted on rotary movement to compressively cam said arm and adjacent gripping plate towards the fixed gripping plate for securing the tail of said fish therebetween, hinge means on the free end of said arm, and a transverse pin loosely journaled on said hinge means and secured to said movable gripping plate.

2. A fish holding clamp comprising, a horizontally disposed support adapted to receive a fish, an elongated flexible base strip centrally positioned adjacent one end of said support and fixedly secured thereto, a fixed gripping plate on the support upon one end of said strip extending transversely thereof, an intermediate portion of said strip being reverse curved and inclined upwardly in opposition to said base strip defining a yieldable arm having a free end, a transverse movable gripping plate upon the free end of said arm, juxtaposed over and normally spaced from said fixed gripping plate, a pair of upright supports joined to intermediate side portions of said base strip and arranged on opposite sides of said arm and projecting thereabove, an elongated upwardly inclined handle overlying said arm, and cam means upon one end of said handle adjacent said supports, pivotally mounted thereon retainingly engaging said arm intermediate its ends and adapted on rotary movement to compressively cam said arm and adjacent gripping plate towards the fixed gripping plate for securing the tail of said fish therebetween, the free end of said arm being bifurcated with spaced end portions thereof formed to provide a pair of hinge elements, and a pin loosely extending transversely through said hinge elements with its ends downturned and fixedly secured to said movable gripping plate.

3. A fish holding clamp comprising, a horizontally disposed support adapted to receive a fish, an elongated flexible base strip centrally positioned adjacent one end of said support and fixedly secured thereto, a fixed gripping plate on the support upon one end of said strip extending transversely thereof, an intermediate portion of said strip being reverse curved and inclined upwardly in opposition to said base strip defining a yieldable arm having a free end, a transverse movable gripping plate upon the free end of said arm, juxtaposed over and normally spaced from said fixed gripping plate, a pair of upright supports joined to intermediate side portions of said base strip and arranged on opposite sides of said arm and projecting thereabove, an elongated upwardly inclined handle overlying said arm, and cam means upon one end of said handle adjacent said supports, pivotally mounted thereon retainingly engaging said arm intermediate its ends and adapted on rotary movement to compressively cam said arm and adjacent gripping plate towards the fixed gripping plate for securing the tail of said fish therebetween, said handle being U-shaped with upright sides, the lower ends of said sides being displaced laterally outward in parallel relation, said cam means including formed cams, and correspondingly shaped inwardly directed flanges projecting from the edges of said cams operatively engaging said arm.

4. A fish holding clamp comprising, a horizontally disposed support adapted to receive a fish, an elongated fexible base strip centrally positioned adjacent one end of said support and fixedly secured thereto, a fixed gripping plate on the support upon one end of said strip extending transversely thereof, an intermediate portion of said strip being reverse curved and inclined upwardly in opposition to said base strip defining a yieldable arm having a free end, a transverse movable gripping plate upon the free end of said arm, juxtaposed over and normally spaced from said fixed gripping plate, a pair of upright supports joined to intermediate side portions of said base strip and arranged on opposite sides of said arm and projecting thereabove, an elongated upwardly inclined handle overlying said arm, and cam means upon one end of said handle adjacent said supports, pivotally mounted thereon retainingly engaging said arm intermediate its ends and adapted on rotary movement to compressively cam said arm and adjacent gripping plate towards the fixed gripping plate for securing the tail of said fish therebetween, hinge means on the free end of said arm, and cooperating hinge means on said movable gripping plate interconnected with said first hinge means providing a pivotal self-aligning mounting for said movable gripping plate.

References Cited in the file of this patent
UNITED STATES PATENTS

| | | |
|---|---|---|
| 893,517 | Keller | July 14, 1908 |
| 1,259,109 | Kugler et al. | Mar. 12, 1918 |
| 2,300,321 | Swezey | Oct. 27, 1942 |
| 2,717,414 | Kline | Sept. 13, 1955 |